Feb. 3, 1942.    R. N. COOLIDGE    2,271,814
FILTERING APPARATUS
Filed Feb. 19, 1941
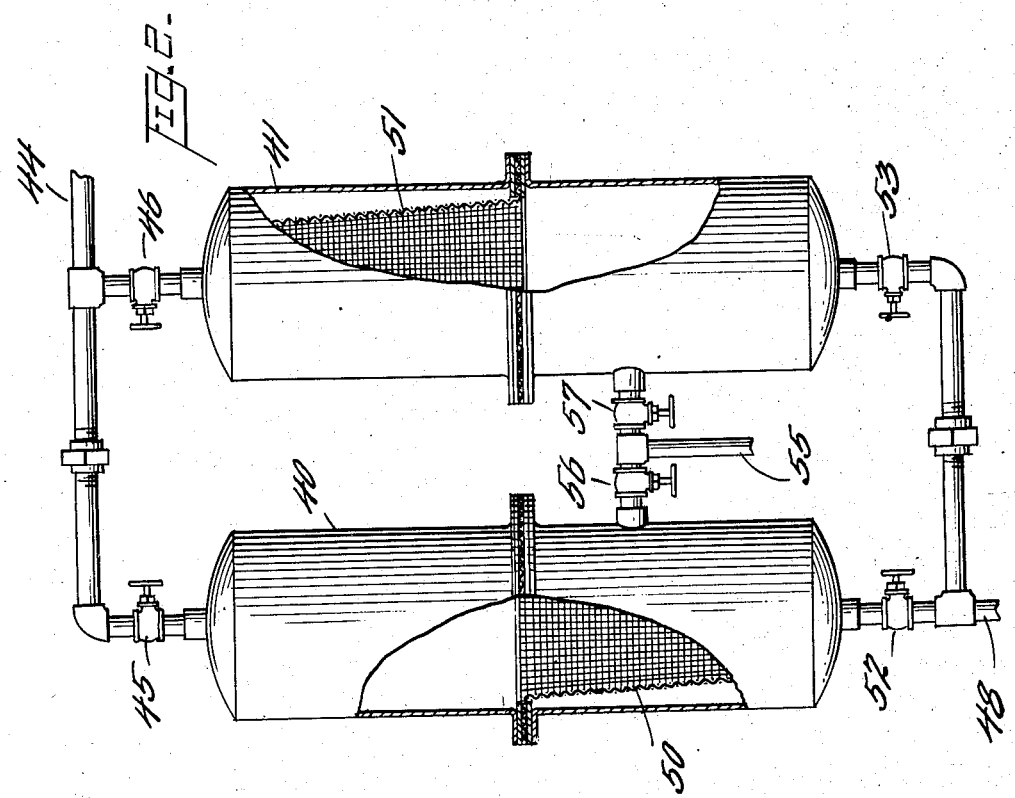
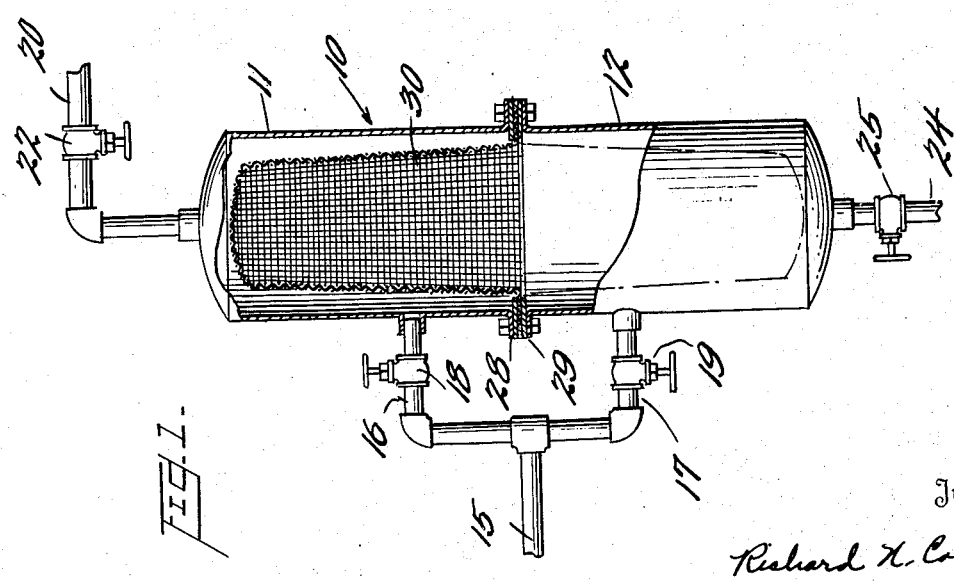
Inventor
Richard N. Coolidge
By Watson, Cole, Grindle & Watson
Attorney Patented Feb. 3, 1942

2,271,814

UNITED STATES PATENT OFFICE 2,271,814

FILTERING APPARATUS

Richard Newell Coolidge, Nashville, Tenn.

Application February 19, 1941, Serial No. 379,676

3 Claims. (Cl. 210—168)

This invention relates to apparatus for filtering solids from liquids, and has for its principal object the provision of a filtering medium which is so constructed and arranged as to facilitate the removal therefrom of solid matter deposited thereon in the course of filtering.

More specifically, it is an object of the invention to provide, in combination with a liquid filtering system in which the direction of liquid flow may be reversed, a filtering medium in the form of an elongated flexible element which is so formed and mounted that on the reversal of the direction of flow of liquid, the filter element is everted, whereby that side on which the solid matter has collected is distended to loosen and at least partially free the solid matter to facilitate removal of the same by the reversely flowing liquid.

Further objects and features of the invention will be apparent from the following description, taken in connection with the accompanying drawing, in which Figure 1 is an elevational view, partly in section, of one form of filter system illustrating the application of my invention thereto; and Figure 2 is a similar view of a modified form of filtering system to which the invention has been applied.

In order to facilitate an understanding of the invention, reference will be made to the several embodiments thereof illustrated in the accompanying drawing and specific language will be employed. It will nevertheless be understood that various further modifications of the devices illustrated herein, such as would fall within the province of those skilled in the art to construct are contemplated as part of the present invention.

Dealing first with Figure 1 of the drawing, it will be observed that the system therein illustrated consists essentially of a chamber indicated generally at 10 which is generally cylindrical in contour, the chamber being constituted for convenience by an upper section 11 and a lower section 12. Liquid is supplied to the chamber 10 from a supply conduit 15, the branch 16 of which communicates with the upper section 11, and the branch 17 of which communicates with the lower section 12 of the chamber. Control valves 18 and 19 are interposed in the respective branches 16 and 17 of the supply conduit 15.

A liquid discharge conduit 20 is connected to one end of the section 11 of the chamber 10, a control valve 22 being associated with the discharge conduit. Connected to the opposite end of the section 12 of the chamber 10 is a waste conduit 24, a control valve 25 being associated therewith. A filter element 30, formed of flexible, liquid pervious material, is attached circumferentially at its mouth to an intermediate portion of the chamber 10, for example by clamping the same between the contiguous annular flanges 28 and 29 of the respective sections 11 and 12 thereof, these flanges and the interposed mouth portion of the filter element being secured together in any suitable manner so as to prevent leakage of liquid from the chamber. The filter element 30 is generally cup-shaped or elongated so as to extend longitudinally of the chamber 10. In the preferred form of the invention, the transverse sectional area of the filter element decreases away from the mouth of the element and is thus generally frusto-conical in shape, as shown in the drawing, whereby the element may readily be everted or turned inside out when the direction of flow of liquid in the chamber 10 is reversed. Thus during normal operation of the system for supplying filtered liquid, for example water, to the discharge conduit 20, the valves 19 and 22 are opened and the valves 18 and 25 are closed. Liquid enters the lower section 12 of the chamber 10 from the supply conduit 15, flows into and through the filter element 30, and is delivered from the end of the section 11 of the chamber into the discharge conduit 20. When it is desired to remove sediment and other filtered solids from the filter element 30, the direction of liquid flow in the chamber 10 is reversed by closing valves 19 and 22 and opening valves 18 and 25. Liquid then flows into the section 11 of the chamber 10 from the supply conduit 15, the filter element 30 is everted and forced into the section 12 by the reversed direction of liquid flow, so as to occupy the position in which it is shown in dotted lines in Figure 1, and the liquid flows into and through the everted filter element and emerges through the waste conduit 24.

When the filter element 30 is everted, that face of the element toward which the liquid first flowed, and which constituted the inner face of the element, becomes the outer face and is thereby appreciably distended so as to effect the cracking off and loosening of the adhered solid material, whereby the reversely flowing liquid may readily effect and complete the removal of such filtered solids. When the filter element has been adequately cleaned, flow in the initial direction through the chamber 10 from the supply conduit 15 to the discharge conduit 20 is controlled by proper manipulation of the several control valves. It is found that the eversion of the filter element in the manner described permits much more effective and efficient cleaning of the element in a shorter period of time than is otherwise possible.

Obviously, if it is desired to employ filtered liquid for cleaning the filter element 30, it is only necessary to close the valve 19 and open the valve 25, the valve 18 remaining closed and the valve 22 open, whereupon filtered liquid will return to the chamber 10 through the discharge conduit 20, causing a reversal of flow through the chamber 10 and eversion of the filter element 30, the liquid and the solids removed from the filter element passing off through the waste conduit 24.

For convenience, the member 10 of the system is referred to herein as a chamber, the term being employed to designate any liquid confining means within which the filter element described herein may be conveniently supported and in which the flow of liquid may be reversed when desired. It is of course important that this chamber and the filter element be so relatively shaped and disposed as to facilitate the eversion of the filter element in the occurrence of reverse liquid flow. The chamber need not be vertically disposed, and such other changes in the construction and relative disposition of the several component parts of the system are contemplated as would occur to one skilled in the art to which the invention relates.

Referring now to Figure 2 of the drawing, it will be observed that the system illustrated therein consists essentially in two filter chambers 40 and 41; a greater number may be employed if desired. Connected to one end of these chambers is a common discharge conduit 44, control valves 45 and 46 being interposed between the respective chambers and the conduit. A common waste conduit 48 is connected to the opposite end of the chambers 40 and 41, control valves 52 and 53 being interposed between the respective chambers and the waste conduit. Filter elements 50 and 51, formed and supported as described hereinbefore with reference to the filter element 30 of Figure 1, are associated with the respective chambers 40 and 41. A common liquid supply conduit 55 is connected to the respective chambers 40 and 41 through control valves 56 and 57, the connections being disposed intermediate the associated filter element and the connection to the common waste conduit 48.

It will be appreciated that the system just described is capable of continuously supplying filtered liquid to the common discharge conduit 44, liquid being supplied through one chamber while the flow of liquid in the other chamber is reversed for the purpose of cleaning the filter element therein. Thus if valves 45, 46, 56, and 57 are opened, valves 52 and 53 being closed, liquid will flow from supply conduit 55 through both filter elements 50 and 51 for delivery to the discharge conduit 44. If valve 56 be now closed, and valve 52 opened, liquid will flow from the supply conduit 55 through the filter element 51, part being delivered to the discharge conduit 44 and part being delivered to the upper section of the chamber 40, whereby the flow direction is reversed in the latter. The filter elements 50 and 51 will now assume the positions in which they are shown in Figure 2, filter element 50 being everted. That face of the filter element 50 on which solid matter has previously been deposited will now be distended or stretched, so that the liquid flowing through the filter element may readily remove the solid matter and discharge the same into the waste conduit 40.

If it is now desired to clean the filter element 51 without interruption of the supply of liquid to the discharge conduit 44, the valves 56 and 53 are opened, valves 45 and 46 remain open, and valves 52 and 57 are closed. Liquid flow in the two chambers is now reversed, the filter element 50 resuming its original position in the upper section of the chamber 40, and the filter element 51 being forced into the lower section of chamber 41 and thereby everted to distend that face on which solid material has collected, whereby such solid material is readily removed and discharged into the waste conduit 48, conduit 44 being supplied with part of the filtered liquid delivered from chamber 40.

It is obviously possible in a system of this character to utilize either or both chambers for the filtering operation and to clean the filter element of either chamber during any necessary period of time and without interruption of filtering action in the other chamber. It will also be noted that the liquid employed during the rinsing or cleaning operation is first filtered, so that at no time is unfiltered liquid delivered to the upper side of either filter element. In other words, any removed solid matter is inevitably collected on the lower faces of the filter elements, from whence it can be readily removed and discharged through the waste conduit.

It is of course contemplated that liquid delivered to the waste conduits in either of the illustrated embodiments of the invention may be fed to a separate settling chamber, not shown, so that the liquid may be rendered suitable for further use when the solid matter has been deposited as sediment. The essential feature of the instant invention is the employment of filter elements which are capable of being everted or turned inside out by reversal of liquid flow, this feature being obviously applicable to a wide variety of distribution systems and to many and widely varied uses.

Having thus described the invention, what is claimed as new and desired to be secured by Letters Patent is:

1. In apparatus for filtering solids from liquids, in combination, a chamber, a bag-like flexible filter element extending across said chamber and dividing the latter into two sections, conduit means for introducing liquid to be filtered into one of said sections, conduit means for discharging filtered liquid from the other said section, waste conduit means associated with said first section, and means for introducing liquid into said second section and causing the same to flow through said filter element in the opposite direction to the normal flow and out through said waste conduit, for everting and cleaning said filter element.

2. In apparatus for filtering solids from liquids, in combination, a chamber, a bag-like flexible filter element extending across said chamber and dividing the latter into two sections, conduit means for introducing liquid to be filtered into one of said sections, means for conducting filtered liquid to or from said other section, waste conduit means associated with said first section, and valves controlling said several conduit means, whereby liquid may be caused to flow in either direction through said filter element, said filter element being everted and cleaned when the flow is from the second said section to the first said section.

3. In apparatus for filtering solids from liquids, in combination, a pair of filter chambers having a common discharge conduit connected to one end of each chamber and a common waste conduit connected to the opposite end of each chamber, a bag-like, flexible filter element extending across an intermediate portion of each said chamber and dividing the same into two sections, a common liquid supply conduit connected to each chamber intermediate the associated filter element and the waste conduit connection, and means for establishing concurrent and oppositely directed liquid flow in said chambers and for reversing said flow, said means including valves interposed between each of said chambers and the said common discharge, waste, and supply conduits, whereby filtered liquid may be caused to flow to the common discharge conduit from one chamber and to the common waste conduit from the other chamber, and whereby the reversal of flow direction everts the respective filter elements to distend that face of the filter element toward which the liquid first flowed and thereby to facilitate the removal of filtered solids therefrom by such reverse flow.

RICHARD NEWELL COOLIDGE.